United States Patent
Mittal et al.

(10) Patent No.: US 6,490,119 B1
(45) Date of Patent: Dec. 3, 2002

(54) METHOD AND APPARATUS FOR MAINTAINING SERVO STABILITY DURING ACTUATOR SATURATION

(75) Inventors: Samir Mittal, Bloomington, MN (US); John C. Morris, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/473,264

(22) Filed: Dec. 27, 1999

Related U.S. Application Data (60) Provisional application No. 60/140,870, filed on Jun. 24, 1999.

(51) Int. Cl.[7] .............................................. G11B 5/596
(52) U.S. Cl. .............................. 360/78.05; 360/78.012
(58) Field of Search ........................ 360/78.05, 78.09, 360/78.12

(56) References Cited

U.S. PATENT DOCUMENTS

| | | | |
|---|---|---|---|
| 4,618,808 A | 10/1986 | Ish-Shalom et al. | 318/696 |
| 5,060,210 A * | 10/1991 | Fennema et al. | 369/32 |
| 5,519,605 A | 5/1996 | Cawlfield | 364/151 |
| 5,614,801 A | 3/1997 | Miramonti | 318/609 |
| 5,627,896 A | 5/1997 | Southward et al. | 381/71 |
| 5,699,334 A | 12/1997 | Yamada et al. | 369/44.32 |
| 5,898,286 A | 4/1999 | Clare et al. | 318/569 |
| 5,940,789 A | 8/1999 | Yuan | 702/150 |
| 5,978,752 A | 11/1999 | Morris | 702/186 |
| 6,052,251 A * | 4/2000 | Mohajerani et al. | 360/78.05 |
| 6,088,187 A * | 7/2000 | Takaishi | 360/78.05 |

FOREIGN PATENT DOCUMENTS

WO 99/08268 5/1998

* cited by examiner

Primary Examiner—Regina N. Holder
Assistant Examiner—Mitchell Slavitt
(74) Attorney, Agent, or Firm—Theodore M. Magee; Westman, Champlin & Kelly, P.A.

(57) ABSTRACT

A method and apparatus are provided for positioning a head over a disc in a disc drive while maintaining servo loop stability. The apparatus includes an actuator-head assembly having a large scale actuator and a micro-actuator that are both able to move the head over the disc. An anti-windup compensation component detects when a micro-actuator controller is producing a micro-actuator control value that will saturate the micro-actuator. Using the micro-actuator control value, the anti-windup compensation component generates a saturation tracking error signal. A summing component then combines a position value that the head generates based on its position over the disc with the saturation tracking error signal to form a position error value that masks the saturation of the micro-actuator.

10 Claims, 4 Drawing Sheets

METHOD AND APPARATUS FOR MAINTAINING SERVO STABILITY DURING ACTUATOR SATURATION

REFERENCE TO RELATED APPLICATIONS

The present application claims priority from a U.S. Provisional Patent Application having Ser. No. 60/140,870 filed on Jun. 24, 1999 and entitled ANTI-WINDUP COMPENSATION IN A DISC DRIVE SERVO SYSTEM INCORPORATING MICROACTUATOR DEVICES.

FIELD OF THE INVENTION

The present invention is related to disc drives. In particular, the present invention is related to servo systems.

BACKGROUND OF THE INVENTION

In a computer disc drive, data is stored on a computer disc in concentric tracks. In disc drives with relatively high track densities, a servo feedback loop is used to maintain a head over the desired track during read or write operations. This is accomplished utilizing prerecorded servo information either on a dedicated servo disc or on sectors that are interspersed along a disc. During track following, the servo information sensed by the head is demodulated to generate a position error signal (PES), which provides an indication of the distance between the head and the track center. The PES is then converted into an actuator control signal, which is used to control an actuator that positions the head.

Historically, only one actuator, typically a voice coil motor, was used to position the head. Recently, micro-actuators have been proposed that would be used in combination with the voice coil motor to position the head. Because they are small, such micro-actuators generally have a better frequency response than the voice coil motor. As such, they are better able to follow high frequency control signals.

Although the micro-actuators have a better frequency response than voice coil motors, they also have a more limited range of motion. When a micro-actuator reaches the limit of its range of motion, increases in the control signal to the micro-actuator do not result in any more movement of the micro-actuator. Under these conditions, the micro-actuator is said to be saturated.

When a micro-actuator saturates in a servo loop, it causes two problems. First, because the stability of the servo loop is designed based on the inclusion of a responsive micro-actuator, when the micro-actuator saturates, it can cause the entire servo loop to become unstable. Second, the actuator controller corresponding to the micro-actuator typically includes some form of past state feedback. When the micro-actuator is unable to move to the position set by the controller, the past state stored in the controller is no longer tied to the movement of the head. This discrepancy in the past states affects the performance of the controller even after the input to the controller drops below a value that would cause the micro-actuator to: saturate. The errors caused by past state discrepancies are known as windup.

Prior art systems have attempted to avoid instability and windup by modifying the gains of the micro-actuator and the voice-coil motor controllers. Although such systems may prevent micro-actuator saturation, they also decrease the overall performance of the servo loop because they make the micro-actuator less responsive to control signals that would not saturate the micro-actuator.

Thus, a servo system is needed that prevents the instability and wind-up associated with micro-actuator saturation but does not affect the performance of the servo loop when the micro-actuator is not saturated.

SUMMARY OF THE INVENTION

A method and apparatus are provided for positioning a head over a disc in a disc drive while maintaining servo loop stability. The apparatus includes an actuator-head assembly having a large scale actuator and a micro-actuator that are both able to move the head over the disc. An anti-windup compensation component detects when a micro-actuator controller is producing a micro-actuator control value that will saturate the micro-actuator. Using the micro-actuator control value, the anti-windup compensation component generates a saturation tracking error signal. A summing component then combines a position value that the head generates based on its position over the disc with the saturation tracking error signal to form a position error value that masks the saturation of the micro-actuator.

DETAILED DESCRIPTION

Figure 1:
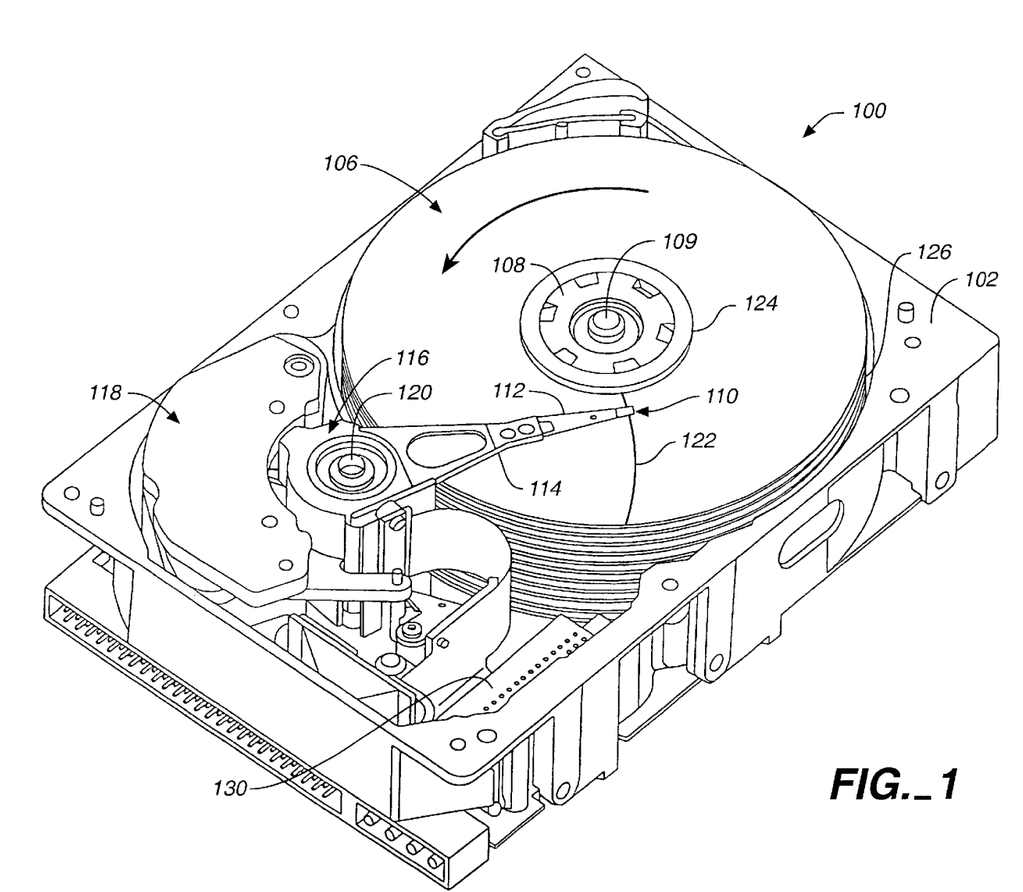
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
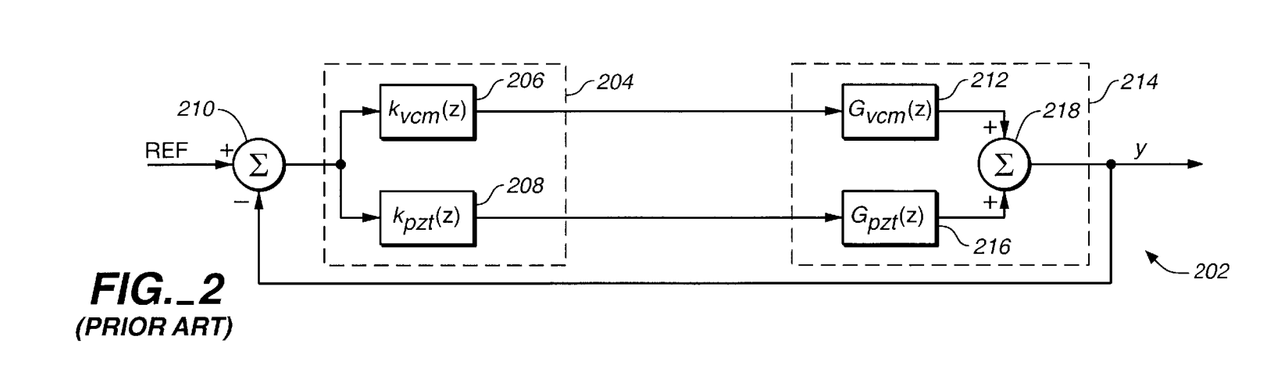
FIG. 2 is a block diagram of a servo loop of the prior art.

FIG. 2 is a block diagram of a servo loop 202 that is found in servo electronics 130 of the prior art. Because the precise structure of the servo loop is not significant to the present invention, servo loop 202 is shown in a simplified form. Those skilled in the art will appreciate that servo loops are more complex than the simple diagram of FIG. 2.

In FIG. 2, servo loop 202 includes a summing node 210 that receives a reference signal (REF) indicating the desired position for a head on the disc. Summing node 210 combines the reference signal with a position value, described below, to produce a position error signal that is provided to a digital controller 204. Digital controller 204 includes a voice coil motor controller 206 and a microactuator controller 208 that each receive the position error signal. Based on the position error signal, voice coil motor controller 206 generates a digital control value that is provided to a voice coil motor 212 in an actuator-head assembly 214. Similarly, micro-actuator controller 208 generates a digital control value that is provided to a micro-actuator 216 in actuator-head assembly 214.

The control values cause voice coil motor 212 and micro-actuator 216 to move, thereby changing the position of the head over the disc. Specifically, the movement of the head is the sum of the head movement caused by the voice coil motor and the head movement caused by the micro-actuator. This summing effect is represented by summing node 218 in FIG. 2.

Using servo patterns stored on the disc, the head generates an analog signal that indicates the distance from the head to the track center. The analog signal is converted into a digital signal within assembly 214 and the digital signal, y, is fed back to summing node 210. Summing node 210 then subtracts the digital signal from the reference signal to produce the position error signal (PES).

The closed-loop gain of the servo loop of FIG. 2 is described by:

$$H_{loop}(z) = \frac{K_{vcm}(z)G_{vcm}(z) + K_{pzt}(z)G_{pzt}(z)}{1 + K_{vcm}(z)G_{vcm}(z) + K_{pzt}(z)G_{pzt}(z)} \qquad \text{EQ. 1}$$

where $H_{loop}(z)$ is the closed-loop gain of the servo loop, "$K_{vcm}(z)$" and "$K_{pzt}(z)$" are the discrete time transfer functions of voice coil motor controller 206 and micro-actuator controller 208, respectively, and "$G_{vcm}(z)$" and "$G_{pzt}(z)$" are the discrete time transfer functions of voice coil motor 212 and micro-actuator 216.

The stability of the servo loop is determined by the denominator of Equation 1. Thus, the stability is dependent on the transfer function of the micro-actuator, "$G_{pzt}(z)$". During the design process, designers generally assume that the transfer function of the micro-actuator will be the same regardless of the magnitude of the control signal provided to the micro-actuator. However, the piezo-electric crystals that form most micro-actuators are stroke limited. As such, when the control signal exceeds a threshold, the transfer function of the micro-actuator suddenly changes. Specifically, the transfer function changes such that a further increase in the magnitude of the control signal does not cause the micro-actuator to move. When a micro-actuator is driven beyond its ability to respond, it is said to be in saturation.

Since the stability of the servo loop is dependent on the transfer function of the micro-actuator, sudden changes in the micro-actuator's transfer function can cause the servo loop to become unstable. Thus, when a micro-actuator becomes saturated, the entire servo loop can become unstable.

In addition, the controllers usually include state information such that the controllers are affected by the past states of the servo loop. When the micro-actuator does not fully respond to its control signal, the past state stored in the controller is no longer accurately tied to the movement of the head. As such, the states of the controller become biased during saturation. Even after the micro-actuator leaves saturation, the biased past states remain in the controller for some time and negatively affect the performance of the controller. This condition is often referred to as windup.

One solution to windup is to design the micro-actuator controller so that it does not drive the micro-actuator into saturation, even during disturbance events such as rotational vibration. However, in order to accomplish this, additional constraints must be placed on the design of the controller. In addition, the resulting transfer function of the micro-actuator controller is changed in such a way that the performance of the servo-loop is affected even when disturbance events are not present.

Figure 3:
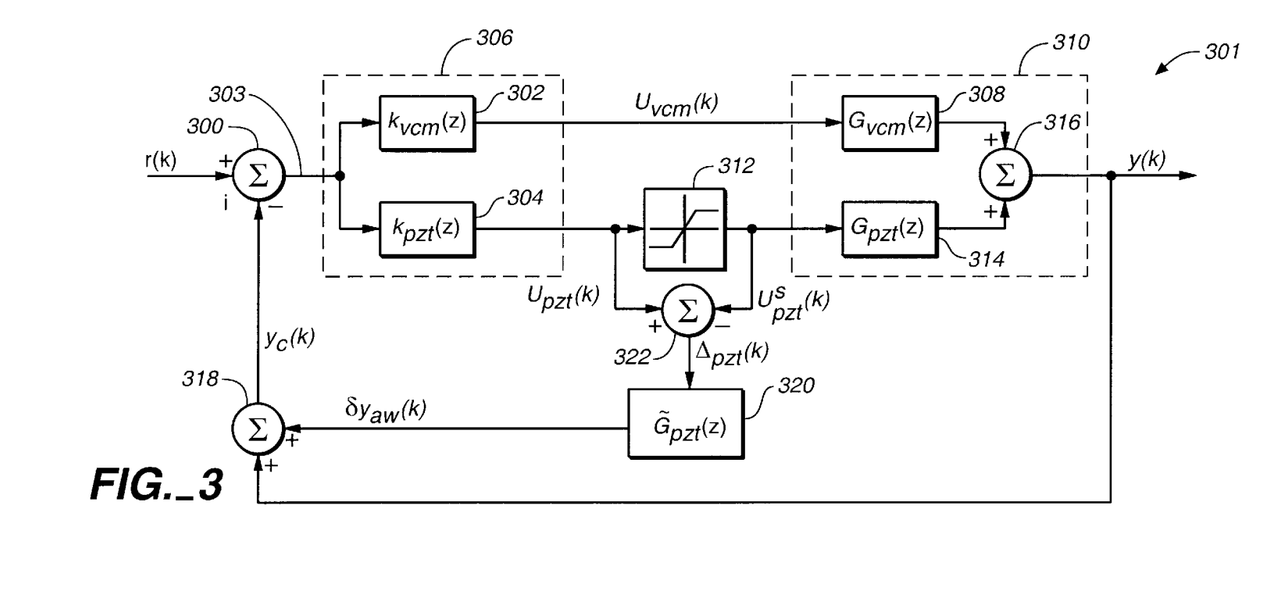
FIG. 3 is a block diagram of a servo loop with anti-windup compensation of the present invention.

FIG. 3 provides a block diagram of a servo loop 301 of the present invention that prevents a micro-actuator from being saturated without placing additional constraints on the micro-actuator controller and without universally affecting the performance of the servo loop. In FIG. 3, a summing node 300 combines a reference value, r(k), with a modified feedback value, $y_c(k)$, which is described further below. The output of summing node 300 is a position error value 303, which is provided to voice coil motor controller 302 and micro-actuator controller 304 in digital controller 306. Based on the position error value, voice coil motor controller 302 generates a voice coil control value, $U_{vcm}(k)$, that is provided to a voice coil motor 308 in actuator-head assembly 310. Similarly, micro-actuator controller 304 generates a micro-actuator control value, $U_{pzt}(k)$, based on the position error value.

Figure 4:
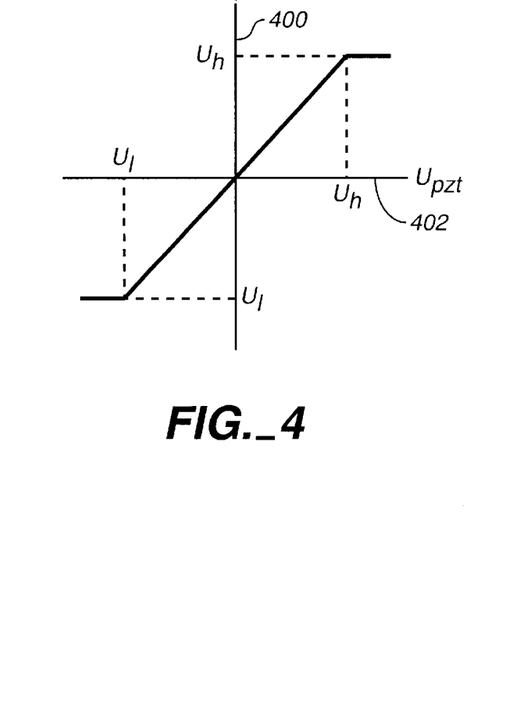
FIG. 4 is a graph of the transfer function of the saturation operator.

The micro-actuator control value is not provided directly to the micro-actuator. Instead, the control value passes through a saturation operator 312, which represents the nonlinear behavior of the micro-actuator due to saturation. Specifically, saturation operator 312 provides a saturation control value, $U_{pzt}^S$ that is expressed as:

$$U_{pzt}^S = \begin{cases} U_h & U_{pzt} \geq U_h \\ U_{pzt} & U_h > U_{pzt} > U_l \\ U_l & U_{pzt} \leq U_l \end{cases} \qquad \text{EQ. 2}$$

where $U_{pzt}^S$ is the output of saturation operator 312, $U_{pzt}$ is the input to saturation operator 312, $U_h$ is the positive threshold saturation value at which the micro-actuator saturates, and $U_l$ is the negative threshold saturation value at which the micro-actuator saturates. This relationship is shown graphically in FIG. 4 where $U_{pzt}^S$ is shown along vertical axis 400 and $U_{pzt}$ is shown along horizontal axis 402.

The output of saturation operator 312 is provided to micro-actuator 314 of actuator-head assembly 310. Based on this modified control signal, micro-actuator 314 moves the head. This movement is combined with the movement generated by voice coil motor 308 as shown by summing node 316 of FIG. 3. At its new location, the head generates a position value, y(k), which is output to servo firmware (not shown) and fed back to a summing node 318.

Summing node 318 also receives a calculated deviation in head position (a tracking error), $\delta y_{aw}(k)$, that is caused by the saturation of the micro-actuator. This calculated deviation is generated by an anti-windup compensator 320 based on the difference, $\Delta_{pzt}(k)$, between the command value provided to saturation operator 312 and the output of saturation operator 312. In FIG. 3, this difference is formed by summing node 322.

In most embodiments, anti-windup compensator 320 models the transfer function of micro-actuator 314, such that the output of anti-windup compensator 320 represents the distance the head would have moved if the micro-actuator had not saturated. The net effect of the summing operation at node 318 is to hide the deterioration in plant performance due to micro-actuator saturation from the controller. By hiding this deterioration, compensator 320 is able to prevent windup and is further able to keep the servo loop operating in a stable range.

During saturation, the effects of compensator 320 can be seen mathematically by examining the composition of the output position value, y(z). From FIG. 3 it can be seen that:

$$y(z) = e(z) \cdot [K_{vcm}(z) \cdot G_{vcm}(z) + K_{pzt}(z) \cdot G_{pzt}(z)] - G_{pzt}(z)\Delta_{pzt}(z) \quad \text{EQ. 3}$$

where e(z) is the z-transform of the discrete-time signal e(k) that is output by summing node 300 and is defined as:

$$e(z) = r(z) - [y(z) + \tilde{G}_{pzt}(z)\Delta_{pzt}(z)] \quad \text{EQ. 4}$$

and where $K_{vcm}$ and $K_{pzt}$ are the transfer functions of the voice coil controller and the micro-actuator controller, respectively, $G_{vcm}(z)$ and $G_{pzt}(z)$ are the transfer functions of the voice coil and the micro-actuator, respectively, $\tilde{G}_{pzt}(z)$ is the transfer function of the anti-windup compensator, r(z) is the z-transform of the reference signal, and $\Delta_{pzt}(z)$ is the z-transform of the difference between the input and output of the saturation control operator.

Equations 3 and 4 can be combined and recast as:

$$y(z) = \frac{Q(z)}{1+Q(z)}r(z) - \frac{Q(z)\tilde{G}_{pzt}(z)}{1+Q(z)}\Delta_{pzt}(z) - \frac{G_{pzt}(z)}{1+Q(z)}\Delta_{pzt}(z) \quad \text{EQ. 5}$$

where:

$$Q(z) = K_{vcm}(z) \cdot G_{vcm}(z) + K_{pzt}(z) \cdot G_{pzt}(z) \quad \text{EQ. 6}$$

If the anti-windup compensator accurately models the micro-actuator, then $\tilde{G}_{pzt}(z) = G_{pzt}(z)$ and equation 5 simplifies to:

$$y(z) = \frac{Q(z)}{1+Q(z)}r(z) - G_{pzt}(z)\Delta_{pzt}(z) \quad \text{EQ. 7}$$

Note that the first term on the right side of Equation 7 represents the closed-loop response of the servo loop without saturation and without the anti-windup compensation. Since the closed-loop response is designed to be stable without saturation, this term represents a stable value. Also note that the second term on the right is zero when the micro-actuator is not being driven into saturation. In other words, the anti-windup compensator is effectively decoupled from the drive controller when saturation conditions are not present. As such, the response of the servo. loop is not affected by the anti-windup compensator when the micro-actuator is operating in its normal mode. This represents an advantage over prior art anti-windup systems that affected the servo loop's response even when the micro-actuator was operating in its normal mode.

As the control signal from the micro-actuator controller increases over the saturation point, the second term on the right side of Equation 7 increases. This represents an error in the positioning of the head. In other words, the second term on the right represents the amount by which the servo system loses tracking for the head. Note that although tracking performance is hindered during saturation, the servo loop's stability is maintained. Also note that although the servo loop does not track as well, the servo firmware continues to receive accurate data concerning the position of the head. As such, the firmware may suspend reading or writing operations if the head drifts too far off track.

In one embodiment, the drive controllers and the anti-windup compensator are realized in fixed point arithmetic using 16-bit state-space realizations that are guaranteed to have less than 1 LSB of quantization error. Numerical overflow is prevented by appropriate closed loop scaling of the controller states and a third order model is used to represent the micro-actuator in the anti-windup compensator. Specifically, the state matrices of the model can be generated providing the measured transfer function of the micro-actuator to suitable control software such as MAT-LAB (available from Mathworks, Inc. of Natick, Mass.).

Figure 5:
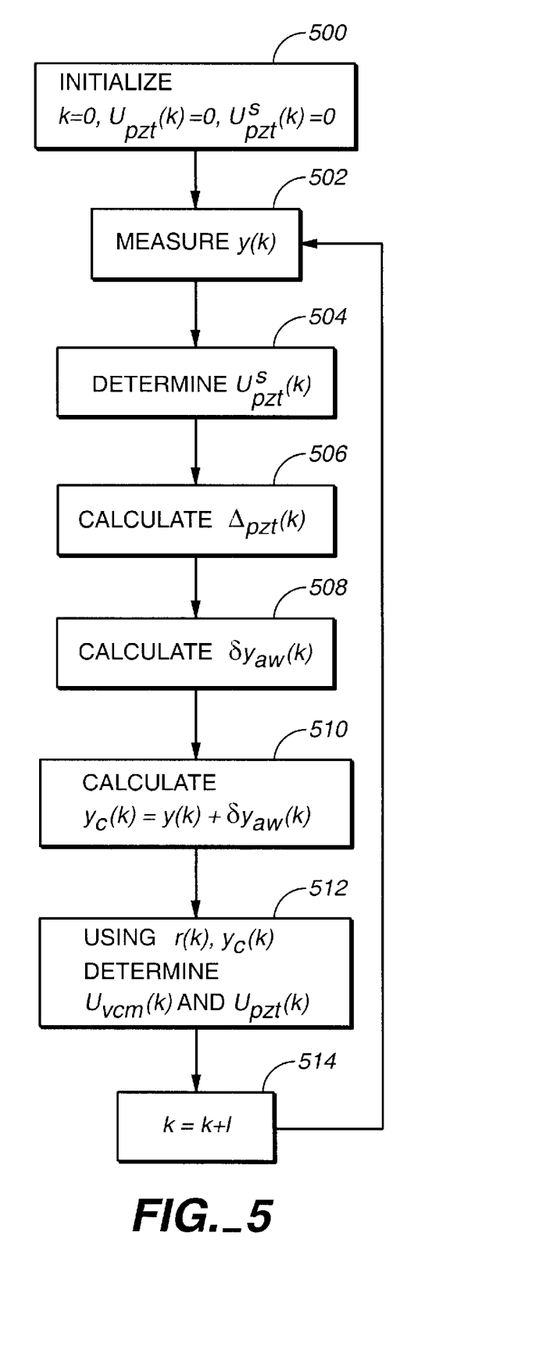
FIG. 5 is a flow diagram of a process for reducing windup in a servo loop.

FIG. 5 provides a flow diagram of a method of implementing an anti-windup compensation scheme under one embodiment of the present invention. At step 500 of FIG. 5, the system is initialized by setting the sector or sample count, k, the output of the controllers and the output of the saturation operator to zero. At step 502, the position value, y(k), is measured at the output of the servo loop.

At step 504, the output of the saturation operator, $U_{pzt}^s$ (k), is determined based on the output of the micro-actuator controller, $U_{pzt}$ (k). At step 506, the difference between the output of the saturation operator and the output of the micro-actuator controller is determined. This difference, $\Delta_{pzt}(k)$, is then used in step 508 to determine the tracking error, $\delta y_{aw}(k)$, using a discrete time filter of the form:

$$x_{aw}(k+1) = \tilde{A}_{aw}(k)x_{aw}(k) + \tilde{B}_{aw}(k)\Delta_{pzt}(k) \quad \text{EQ. 8}$$

$$\delta y_{aw}(k) = \tilde{C}_{aw}(k)x_{aw}(k) + \tilde{D}_{aw}(k)\Delta_{pzt}(k) \quad \text{EQ. 9}$$

where $x_{aw}(k)$ is an internal state variable and $\tilde{A}_{aw}$, $\tilde{B}_{aw}$, $\tilde{C}_{aw}$, and $\tilde{D}_{aw}$ are state space realizations of $\tilde{G}_{pzt}(z)$ that follow the relationship:

$$\tilde{G}_{pzt}(z) = \tilde{C}_{aw}(zI - \tilde{A}_{aw})^{-1}\tilde{B}_{aw} + \tilde{D}_{aw} \quad \text{EQ. 10}$$

After the tracking error has been calculated at step 508, the modified position value, $y_c(k)$, is calculated at step 510 as:

$$y_c(k) = y(k) + \delta y_{aw}(k) \quad \text{EQ. 11}$$

At step 512, the voice coil motor control value, $U_{vcm}$ (k), and the micro-actuator control value, $U_{pzt}$ (k), are determined using:

$$x_{cont}(k+1) = A_{cont}(k)x_{cont}(k) + B_{cont}(k)\begin{bmatrix} r(k) \\ y_c(k) \end{bmatrix} \quad \text{EQ. 12}$$

$$\begin{bmatrix} U_{vcm}(k) \\ U_{pzt}(k) \end{bmatrix} = C_{cont}(k)x_{cont}(k) + D_{cont}(k)\begin{bmatrix} r(k) \\ y_c(k) \end{bmatrix} \quad \text{EQ. 13}$$

where $x_{cont}(k)$ is an internal state variable and $A_{cont}$, $B_{cont}$, $C_{cont}$, and $D_{cont}$ are state space realizations of the plant model that follow the relationship:

$$K_{pzt,vcm}(z) = \begin{bmatrix} K_{vcm}(z) \\ K_{pzt}(z) \end{bmatrix} = C_{cont}(zI - A_{cont})^{-1}B_{cont} + D_{cont} \quad \text{EQ. 14}$$

where $K_{pzt,vcm}(z)$ is the combined transfer function for both the micro-actuator controller and the voice coil motor controller.

At step 514, the system is incremented to the next servo sample or sector by incrementing k to k+1.

Figure 6:
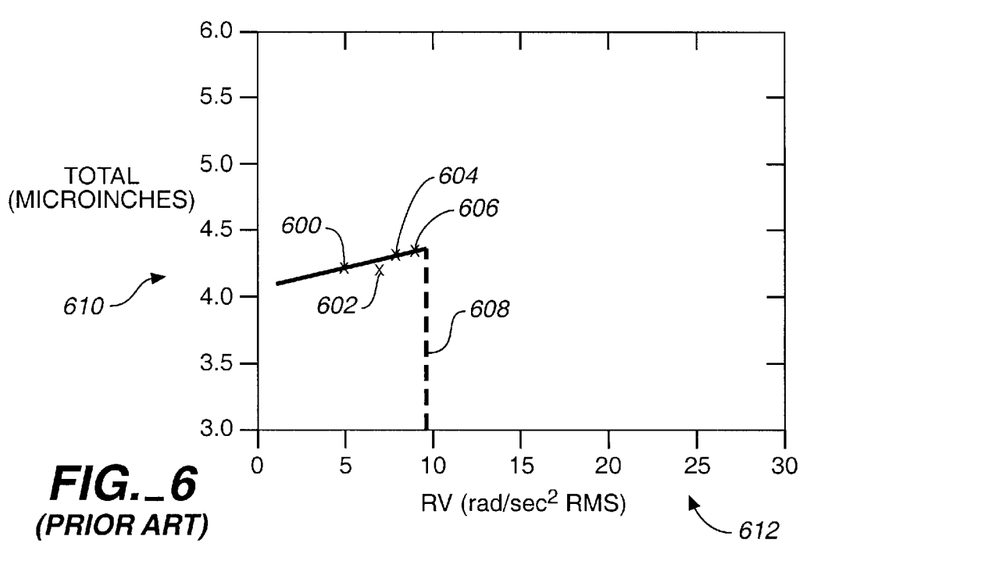
FIG. 6 is a graph of position error as a function of disturbance accelerations for a servo loop of the prior art.

FIG. 6 is a graph of position error as a function of rotational acceleration produced by a servo loop of the prior art. Position error in microinches is shown along vertical axis 610 and rotational acceleration in radians per second squared is shown along horizontal axis 612. Samples, such as samples 600, 602, 604, and 606 are marked by small x's and represent the position values, y(k), produced by the servo loop for a corresponding rotational disturbance in the drive. Line 608 represents the point at which a rotational disturbance caused the servo loop to destabilize due to microactuator saturation.

Figure 7:
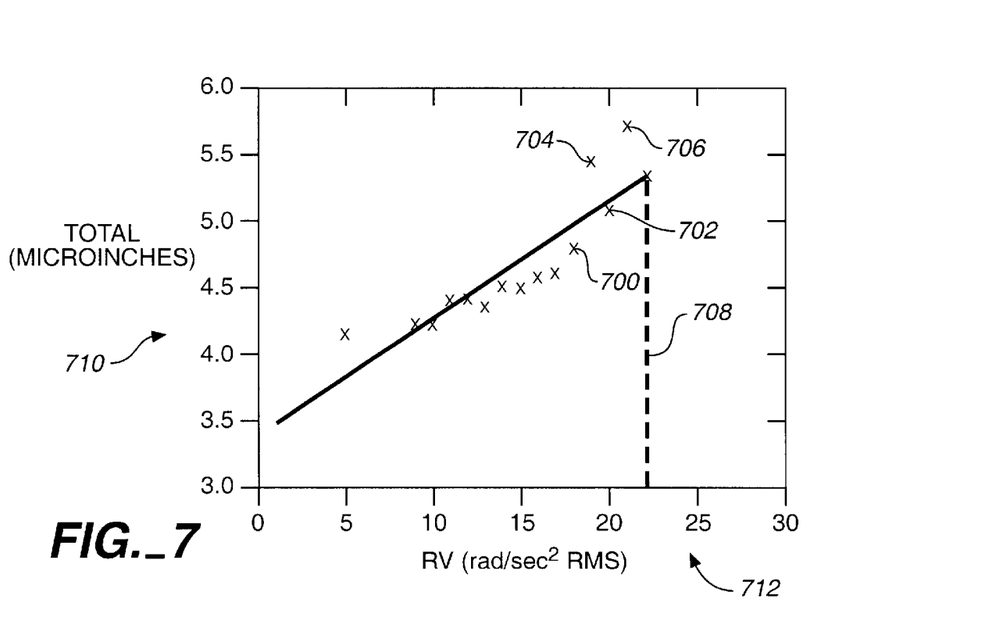
FIG. 7 is a graph of position error as a function of disturbance accelerations for a servo loop of the present invention.

FIG. 7 is a graph of position error as a function of rotational acceleration produced by a servo loop of the present invention with anti-windup compensation. Position error in microinches is shown along vertical axis 710 and rotational acceleration in radians per second squared is shown along horizontal axis 712. Samples, such as samples 700, 702, 704, and 706 are marked by small x's and represent the position values, y(k), produced by the servo loop for a corresponding rotational disturbance in the drive. Line 708 represents the point at which a rotational disturbance caused the servo loop to destabilize.

The performance characteristics of the present invention can be seen by comparing FIGS. 6 and 7. Specifically, it can be seen that under the prior art the servo loop destabilizes at an acceleration of roughly 9 rad/sec$^2$. However, under the present invention, the servo loop does not destabilize until an acceleration of 21 rad/sec$^2$. Thus, the servo loop of the present invention is able to handle more than twice the disturbance of the prior art without destabilizing.

In summary, the present invention provides a servo loop 301 for a disc drive 100 that positions a head 110 over a disc 106 while maintaining servo loop stability. The servo loop 301 includes an actuator-head assembly 310 having a large scale actuator 308 and a micro-actuator 314 that are both able to move the head 110. The head 110 generates a position value, y(k), based on the head's location over the disc.

A micro-actuator controller 304 generates a micro-actuator control value, $U_{pzt}(k)$, for driving the micro-actuator based on a position error value 303. An anti-windup compensation component 312, 322, 320, coupled to the micro-actuator controller 304 generates a saturation tracking error, $\delta y_{aw}(k)$, based on the actuator control value. A summing component 318, 300 then combines at least the position value from the head and the saturation tracking error to form the position error value 303.

A method under the present invention determines a position error value 303 in a servo loop 301, having an actuator 314, a head 110 and a disc 106. The method includes generating a position value, y(k), based on the position of the head 110 over the disc 106. An actuator control value, $U_{pzt}$(k), is then generated and examined to determine if it is larger than a threshold saturation value, $U_h$, $U_l$ for the actuator 314. A tracking error, $\delta y_{aw}(k)$, is then generated based on the amount by which the actuator control value exceeds the threshold saturation value. The position: error value is generated based in part on the position value and the tracking error.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims re expressed. For example, the anti-windup compensator may be implemented in hardware instead of software without departing from the scope and spirit of the present invention. Other modifications can also be made.

What is claimed is:

1. A servo loop in a disc drive for positioning a head over a disc while maintaining servo loop stability, the servo loop comprising:

an actuator-head assembly comprising the head, a large scale actuator and a micro actuator, both the large scale actuator and the micro-actuator being capable of moving the head over the disc, and the head being capable of generating a position value based on its location over the disc;

a micro-actuator controller capable of generating a micro-actuator control value for driving the micro-actuator based on a position error value;

an anti-windup compensation component coupled to the micro-actuator controller and capable of generating a saturation tracking error based on the micro-actuator control value; and a summing component capable of combining at least the position value from the head and the saturation tracking error to form the position error value that is provided to the micro-actuator controller.

2. The servo loop of claim 1 wherein the anti-windup compensation component comprises a saturation operator that receives the micro-actuator control value and that selects and provides a saturation control value, the saturation control value selected by comparing the magnitude of the actuator control value to the magnitude of a threshold saturation value of the same polarity and selecting the value with the smaller magnitude as the saturation control value.

3. The servo loop of claim 2 wherein the anti-windup compensation component further comprises a difference node that receives the micro-actuator control value and the saturation control value and that produces a difference value representing the difference between the actuator control value and the saturation control value.

4. The servo loop of claim 3 wherein the anti-windup compensation component further comprises a mnicro-actuator model that models the transfer function of the micro-actuator and that produces the saturation tracking error based on the difference value.

5. The servo loop of claim 2 wherein the saturation control value is provided to the micro-actuator in order to drive the micro-actuator.

6. A method of determining a position error value in a servo loop of a disc drive having an actuator, a head, and a disc, the method comprising steps of:

(a) generating a position value based on the position of the head over the disc;

(b) generating an actuator control value;

(c) generating a tracking error based on the amount by which the actuator control value exceeds a threshold saturation value; and (d) generating the position error value based in part on the position value and the tracking error.

7. The method of claim 6 wherein generating a tracking error comprises steps of:
   (c)(1) generating a saturation control value by selecting the smallest magnitude value in a set of values containing the actuator control value and a threshold saturation value of the same polarity as the actuator control value;
   (c)(2) subtracting the saturation control value from the actuator control value to generate a difference value; and
   (c)(3) generating the tracking error based on the difference value.

8. The method of claim 7 wherein generating the tracking error further comprises providing the difference value as input to a model having a similar transfer function as the actuator, the output of the model providing the tracking error.

9. The method of claim 6 wherein the actuator is a micro-actuator.

10. A disc drive for storing information on a disc, the disc drive comprising:
   an actuator coupled to a head and capable of moving the head to different locations across the disc based on control values produced by an actuator controller;
   anti-windup compensation means, coupled to the actuator controller and the actuator and capable of reducing windup due to actuator saturation.

* * * * *

UNITED STATES PATENT AND TRADEMARK OFFICE
CERTIFICATE OF CORRECTION

PATENT NO. : 6,490,119 B1  Page 1 of 1
DATED : December 3, 2002
INVENTOR(S) : Mittal et al.

It is certified that error appears in the above-identified patent and that said Letters Patent is hereby corrected as shown below:

Column 8,
Line 52, after "a" replace "mnicro-" with -- micro --.

Signed and Sealed this

Fourth Day of March, 2003

JAMES E. ROGAN
*Director of the United States Patent and Trademark Office*